Sept. 28, 1965     B. M. LIDE     3,209,341

POSITION INDICATING ARRANGEMENT

Filed Jan. 30, 1961     3 Sheets-Sheet 1

INVENTOR
Basil M. Lide
BY D. O. Smith
ATTORNEY

Sept. 28, 1965  B. M. LIDE  3,209,341
POSITION INDICATING ARRANGEMENT
Filed Jan. 30, 1961  3 Sheets-Sheet 2

3,209,341
POSITION INDICATING ARRANGEMENT

Basil M. Lide, Pittsburgh, Pa., assignor to Westinghouse Electric Corporation, East Pittsburgh, Pa., a corporation of Pennsylvania
Filed Jan. 30, 1961, Ser. No. 85,870
7 Claims. (Cl. 340—196)

The present invention relates to position indicating arrangements and more particularly to such arrangements employed in conjunction with linear motion devices.

Where it is desired to impart linear or other motion to a movable element in a given physical system, it is ordinarily equally as desirable to provide continuously by physical means an accurate indication of the position of the element relative to some reference point. For example, it is desirable in certain applications to ascertain the exact position of the valve mechanism in a hermetically sealed valve, otherwise to determine the exact location of a relatively inaccessible member which is movable within a given system. This is certainly the case if the movable element is operationally significant in the system and if the system itself is a sealed one, or in more general applications, if the element is simply not accurately observable. For the purpose of relatively optimizing accuracy in the position indicating function, the indicating arrangement must not only indicatingly respond to some basic parameter(s) of the system but also must compensate for error which may arise from variable physical conditions or other parameters characterizing the system in which the movable element is employed.

As an illustation, consider a system in which a linearly movable element of magnetic material is located in a sealed closure and a coil is distributed along the path of the element in a manner that enables the latter to move with respect to the coil. The position of the element can then be generally determined since the extent to which the element is inserted inwardly of the coil will be determinative of the overall inductive reactance of the latter. Thus, in an otherwise complete indicating arrangement, the use of the variable coil reactance as a basic parameter leads at least to a general indication of the position of the movable element.

To continue with this illustration, there are numerous physical conditions or factors or parameters, other than the coil reactance, which are potential sources of error when it is assumed that the coil reactance is exclusively and linearly dependent upon the position of the movable element as it could ordinarily be in the ideal case where magnetically linear operation is provided and where miscellaneous variants are neglectable. These factors include, among others, variation in the voltage and frequency of the source employed to energize the coil and, as is common in many applicative problems, the matter of ambient temperature and its effect upon circuit resistance, iron losses and permeability. In addition, eddy current and hysteresis losses vary from position to position independently of changes in ambient temperature, and discontinuities or non-uniformities in necessary structural magnetic material which is adjacent to the coil along its length may independently lead to a functional relation between the coil reactance and the position of the movable element which is a generally discontinuous or a non-linear one. In any event, it is clear that accuracy of indication in this example requires that the functional relation between the coil reactance and the position of the movable element as altered from idealized form by miscellaneous variable conditions or parameters be accurately determined and that the indicating arrangement be so formed as to respond indicatingly to changes in the coil reactance while simultaneously compensating for error effects of the variable conditions or parameters.

Accordingly, it is an object of the invention to provide a novel arrangement for indicating the position of a movable element with a high degree of accuracy.

Another object of the invention is to provide an indicating arrangement of the character described in the first object in such a manner that compensation is provided for numerous varying condition and parameters so as to lead to accuracy in the indicating function.

A further object of the invention is to provide an indicating arrangement of the character described in the first object, with the arrangement including circuitry so formed as to lead to the compensation described in the second object.

An additional object of the invention is to provide an indicating arrangement of the character described in the first object, with the arrangement including a servo system which is effective to provide an indicating output in response to an error input comprising the difference between a reference quantity and a sensed quantity derived from a parameter varying in accordance with the position of the movable element.

Another object of the invention is to provide a novel arrangement for indicating the position of a movable element in which error otherwise attributable to temperature variation is relatively minimized.

Still another object of the invention is to provide a novel arrangement for indicating the position of a movable element in which error otherwise attributable to iron losses, where magnetic circuitry is included in the arrangement, is relatively minimized.

It is another object of the invention to provide a novel arrangement for indicating the position of a movable element in which error otherwise attributable to variations in supply voltage and frequency, where circuitry is employed, is relatively minimized.

It is a further object to the invention to provide a novel arrangement for indicating the position of a movable element in an accurate manner even though the arrangement responds to changes of position of the element according to differing functional relations over different segments of the path of travel of the element.

Another object of the invention is to provide an indicating arrangement of the character described in the first object, with the arrangement including circuitry having inductance means for purposes including that of detecting the position of the movable element by providing a sensed voltage and a reference voltage with the difference between these two voltages being used to effect an accurate indication of the position of the movable element.

An additional object of the invention is to provide an indicating arrangement as described in the preceding object, with the circuitry being so formed as to minimize error otherwise attributable to parameters such as temperature, iron losses, supplied frequency and voltage.

Still a further object of the invention is to provide an indicating arrangement as described in the preceding object, with the indicating arrangement providing an accurate indication of the position of the movable element even though the response of the inductance means to changes in position of the movable element has differing functional relations with respect to the position of the movable element over different segments of the path of travel of the movable element.

Another object is to provide means for measuring the position of a controlling element of a mechanical system where the controlling element is physically inaccessible to mechanical or electrical connection.

These and other objects of the invention will become more apparent upon consideration of the following detailed description along with the attached drawings, in which.

According to the broad precepts of the invention, the position of a movable element anywhere along a predetermined path of its movement is accurately determined or indicated through the use of an arrangement of electrical and mechanical elements responding to that movement and being effective to compensate for a plurality of varying parameters or conditions which would otherwise lead to indicating error. Thus, means are provided for responding to the position of the movable element so as to provide an output quantity which varies as a function of the element position. In order to offset error ordinarily attributable to voltage, frequency, temperature and other variations, reference circuit means may be employed to provide an output conformable with the responding means output and thereby provide a basis for a substantially accurate indication of the element position. In some applications where the responding means output varies according to one function over one range of movement of the element and according to another function over another range of movement of the element, the invention nevertheless enables a substantially accurate indication of the element position to be obtained.

Figure 1:
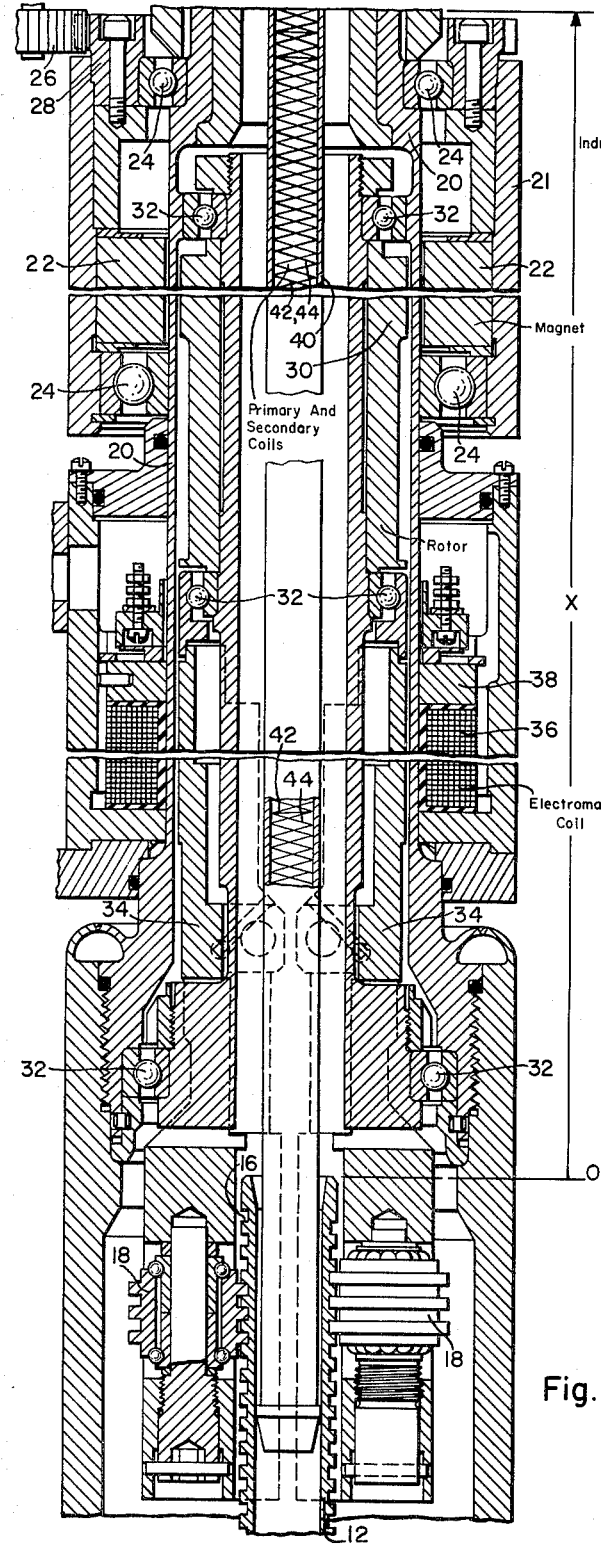
FIGURE 1 is a partial cross-sectional view of a structural arrangement in which a movable element is located.
Figure 2:
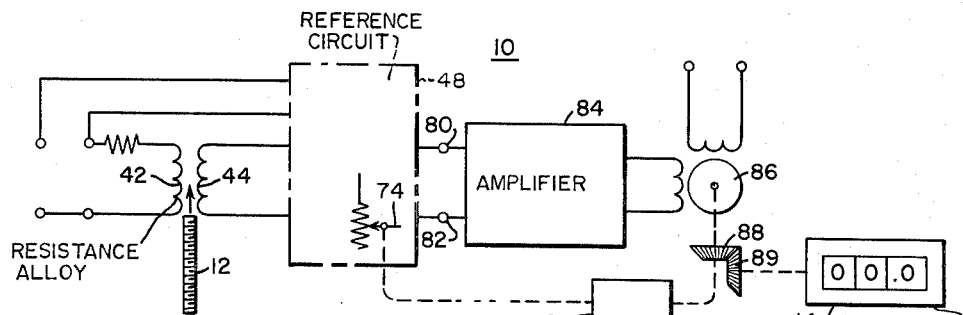
FIGURE 2 is a schematic representation of a position indicating arrangement formed in accordance with the principles of the invention.

More specifically, in the interest of clarifying these broad precepts, reference is to be made to FIG. 2 where there is shown an arrangement 10 for indicating the position of elongated movable element 12, in this case a linearly movable element. The arrangement 10 is, in this example, an electromechanical one having servo-mechanical characteristics and is adapted for sensing the position of the movable element 12 and for accurately indicating this position on indicating means which are provided in the form of a counter 14. The element 12 is threaded as indicated by the reference character 16 (FIG. 1) and, being supported by suitable means against rotative and lateral movement, is driven longitudinally by toothed roller nuts 18.

In this instance, the element 12 is supported to move as described in an elongated and sealed, generally tubular closure 20 formed, for example, from stainless steel. Assuming that the longitudinal dimension of the closure 20 is directed uprightly, the lower end of the closure 20 can be sealingly supported upon structure in which the operation of a given physical system can be controlled or otherwise effected through response to movement of the element 12 (or to another member securingly attached thereto). For example, the element 12 might be used to control flow in a fluid system for the positioning of a tool or the rate at which a chemical reaction occurs in a chemical system.

Externally of and relative to the closure 20, a stator 21 including a permanent magnet 22 is rotatably supported on bearings 24 and is driven by gears 26 and 28 with mechanical power being supplied through the gear 26 from a separate mechanical power source. Internally of, and relative to, the closure 20 a hollow rotor 30 of magnetic material is rotatively supported on bearings 32.

The stator 21 and the rotor 30 are so formed as to enable the latter to respond with rotative movement when the stator 21 rotates. The roller nuts 18 are supported on arms 34 which are in turn supported pivotally relative to the rotor 30. An electromagnetic coil 36, with surrounding magnetic material, as indicated by the reference character 38, is normally energized to latch or to hold by magnetic force the pivot arms 34 in a position where the annular teeth of nuts 18 engage the threads of element 12. Additional coils (not shown) may be arranged, if desired, along the closure 20 adjacently of the nuts 18 so as to provide for disengaging the latter from the element 12 where it is desired to allow for rapid release of the element 12 under emergent circumstances existing in the previously-mentioned physical system with which the element 12 is operationally related.

A tube 40, desirably of a non-magnetic structural material, is supported, for purposes to be determined, so as to extend longitudinally and coaxially within the element 12. In FIG. 1, the element 12 is illustrated in its lowermost position and it is disposed for upward movment along the tube 40. The length of one portion of the path of travel of the element 12 is indicated as being X units from its lowermost or zero position to a position slightly above the gear 28. In addition, the path of travel includes another coaxial portion (not shown) which extends Y units above the latter position. The latter path portion is enclosed by the closure 20 which extends along its length and is generally nonmagnetic or free from surrounding magnetic structure, as contrasted to the considerable amount of magnetic structure surrounding the one path portion (such as the stator 21, the rotor 30 and the material 38 adjacent the latch magnet coil 36). Thus, stator 21, rotor 30, coil 36 and members 38 serve as magnetic influencing means which affect the magnetic coupling between the portions of coils 42 and 44 thereadjacent.

Means are provided in the indicating arrangement 10 for responding to changes in the position of the element 12 by sensing changes in a basic measurable parameter which varies in accordance with the position of the element 12. The responding means include a primary coil 42, which is energized by an A.C. source 46, and a secondary coil 44, both of which are wound in insulated relationship with one another upon a suitable form, if desired, and within and along the length of the tube 40. The basic parameter here, therefore, is the inductance of the primary coil 42 which will vary according to the position of the magnetic element 12. Thus, as the element 12 moves upwardly as viewed in FIG. 1, along the coil, the primary inductance increases.

In measuring the inductance of the primary coil 42 by conventional means, such as an Owens bridge, the ohmic resistance component which varies as a function of temperature is difficult to offset in the inductance measurement. By making use of the fact that inductance may be defined as flux linkages per ampere, the secondary 44 is here provided with constant and maximum mutual inductance so that the resultant induced voltage in the secondary 44 is proportional to flux linkages of the primary 42 and, with current in the primary 42 maintained nearly constant by a high resistive component of impedance of the primary 42, the secondary voltage is truly proportional to the primary inductance. Thus, it is preferred, for the above reasons and for reasons to be determined as this description continues, that the primary coil 42 be formed of a resistive alloy so as to enable the primary current of the coil 42 to be constant and nearly in phase with the supply voltage.

Figure 4:
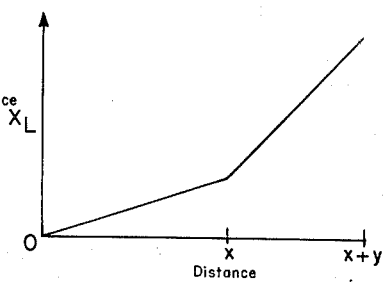
FIGURE 4 is a graphic representation of the inductance of coils located along the path of travel of the movable element in the structural arrangement of FIG. 1 as a function of distance along that path.

In general, the rate of change of primary inductance or secondary voltage as a function of position of the element 12 over the one path portion (namely, substantially constant from O to X) may, and in this case does, by virtue of the aforedescribed magnetic coupling influencing means, differ from that over the other path portion (namely, substantially constant from X to $X+Y$). In fact, for all practical purposes, a discontinuity exists between the two path portions as readily observed in FIG. 4 where primary inductance or secondary voltage is schematically plotted against path distance. The reasons for this difference include the fact that the element 12 has less modifying effect upon the magnetic circuit of the coils 42 and 44 over the one path portion (O to X) than over the other path portion (X to $X+Y$) because of the substantial amount of magnetic material which surrounds the one path portion (O to X). In one application of the invention, the distance X equalled 28 inches and the distance Y equalled 20.5 inches.

In order to minimize error effects which would arise, as will become more apparent hereafter, in the output of the coil 44 if the output were to be measured directly as an indicator of inductance and position of the element 12, it is preferred that the indicating arrangement 10 operate on a comparative basis, namely that the arrangement 10 include reference circuitry having an output simulating that of the coil 44 and being comparable to the latter with any difference or error between the two being responded to servo-mechanically to adjust the reference output until it conforms with the output of the secondary coil 44. The reference circuitry can therefore function to control the counter 14 in indicating accurately the position of the element 16.

Thus, the indicating arrangement 10 includes circuit means 48 for providing a reference output simulating that of the coil 44. In order to determine what the output of the reference means 48 is to be, it is necessary that the output of the secondary coil 44 be defined for all positions of the movable element 12, with all other parameters being held constant.

Figure 5:
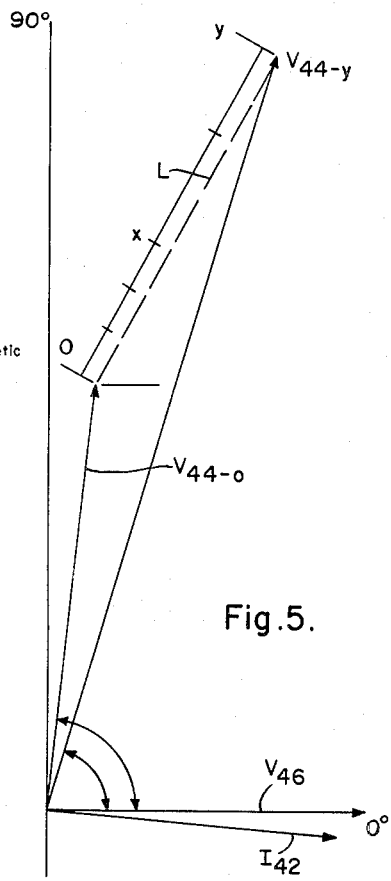
FIGURE 5 is a vector diagram of voltages which pertain to the circuit of FIG. 3 and which correspond to certain positions of the movable element.

In FIG. 5, the voltage of the source 46 is shown as a horizontal vector $V_{46}$. Since a considerable portion of the source voltage is applied across the primary coil 42 and since the resistance of the latter is relatively large, the current through the primary coil 42, as represented by the vector $I_{42}$, is nearly in phase with the source voltage vector $V_{46}$. Thus, the flux created by the current $I_{42}$ induces in the secondary coil 44, when the movable element 12 is in its lowermost position, a voltage represented by the vector $V_{44-O}$. This vector angularly leads the current vector $I_{42}$ by approximately 90°.

The flux created by the current $I_{42}$ through the primary coil 42 increases, for reasons already considered, as the movable element 12 is raised along the tube 40. The change in magnitude of the induced voltage across the secondary coil 44 is substantially linear at one rate of change from positions O to X of the element 12 and is relatively linear at another rate of change from positions X to $X+Y$ of the element 12.

The voltage existing across the secondary coil 44 when the movable element 12 has been moved to the position $X+Y$ is indicated in FIG. 5 by the vector $V_{44-Y}$. It is to be noted that, as the movable element 12 proceeds upwardly, the current through the primary coil 42 remains essentially constant in both phase and magnitude because the change in inductive reactance in the primary circuit branch is relatively small compared to the resistance of the primary coil 42. However, both the phase and the magnitude of the voltage across the secondary coil 44 are changed with movement of the movable element 12 both because of the change in the flux linking the secondary coil 42 and because iron losses are being introduced, resulting in the shifting of the phase of the voltage across the secondary coil 44. Since the coil iron is operated at low flux density, losses increase nearly linearly with upward movement of the element 12, and the voltage across the secondary coil 44 for various intermediate positions of the element 12 is represented by respective vectors which terminate on a straight line locus L. In this connection, it will be understood that the scale of the distance from O to X differs from the distance scale from X to Y in FIG. 5.

The reference circuit means 48, preferably being physically supported by suitable means outwardly of the closure 20, include a transformer 50 and a transformer 52, with the latter transformers having stationary cores and primaries 54 and 56, respectively, in series with the primary coil 42. The primaries 54 and 56 are provided with relatively low resistance, and low but sufficient inductance for functioning purposes, so as not to interfere with the phase relations between the line voltage $V_{46}$ and the primary coil current $I_{42}$. The transforming effect of the transformers 50 and 52 provides respective secondary outputs of magnitude and phase greater than that of the voltage vectors $V_{44-O}$ and $V_{44-Y}$ so as to enable both phase and magnitude adjustment to be obtained for simulating purposes.

Figure 7:
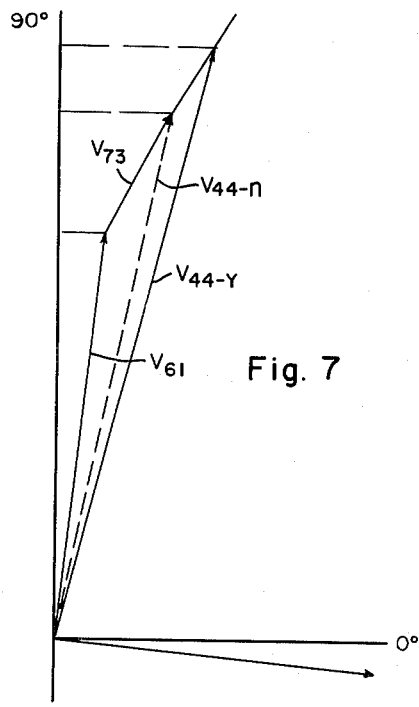
FIGURE 7 is a vector diagram pertaining to the operation of the circuit of FIG. 3; and, FIGURE 8 is a vector diagram pertaining to the operation of the circuit of FIG. 6.

To provide a reference voltage which can equal the voltage across the secondary coil 44 for any position of a movable element 12, it is only necessary that the reference circuit means 48 provide a voltage $V_{61}$ (FIG. 7) having the phase and magnitude of the vector $V_{44-O}$ and another voltage $V_{73}$ (FIG. 7) having the phase of the locus line L and a magnitude variable from a zero value to that value which enables the vectors $V_{61}$ and $V_{73}$ to be added vectorially to equal $V_{44-Y}$. Thus, the secondary voltage of the transformer 50 is impressed across circuitry for adjusting the phase and magnitude of the latter so as to provide $V_{61}$ in alignment with $V_{44-O}$. This circuitry includes in this instance a shunt variable resistor 58 for phase control and a series potentiometer 60, having an arm 63, for magnitude control.

The secondary voltage of the transformer 52 is adjusted to provide $V_{73}$ in phase with the locus line L through the use of a shunt variable resistor 62 and is adjustable to provide $V_{73}$ with variable magnitudes through the use of an output potentiometer 64 having an arm 74. Since the rate at which the magnitude of the output voltage from the potentiometer 64 is to vary over the distance O to X must differ from that over the distance X to $X+Y$, the potentiometer 64 is tapped, as indicated by the reference character 66, and a second fixed resistor 68 is paralleled with one potentiometer portion 70. Thus, the rate of voltage change over the potentiometer portion 70 differs from that over another potentiometer portion 72 for a given amount of movement of the potentiometer arm 74.

Theoretically, the position of the potentiometer tap 66 would be located at $$\frac{X}{X+Y}$$

times the total length of the potentiometer resistance element (assuming here that the latter is distributed linearly). To correct for the phase effects created by the non-linearity of losses being introduced, another parallel circuit branch including a resistor 76 and a capacitor 78 are provided.

With the voltage across a portion 61 of the potentiometer 60 being serially added to the voltage across a portion 73 of the potentiometer 64, a reference voltage is obtained for comparison to the output voltage of the secondary coil 44. The reference voltage is aligned with the output voltage of the coil 44 at extreme positions of the movable element 12. Accordingly, intermediate positions of the movable element 12 lead to various voltages $V_{44-n}$ (FIG. 7) across the coil 44, all of which terminate vectorially on the locus L. Any difference between the coil and reference voltages leads, in a manner to be described subsequently, to a movement of the potentiometer arm 74, which in turn drives the counter 14 until the voltages are equal (i.e. in FIG. 7 until $V_{73}$ changes from the vector value of $V_{44-y}$ to that of $V_{44-n}$). Thus, with proper alignment of the indicating arrangement 10, the counter 14 directly indicates the position of the element 12.

Since the primary coil 42 and the transformer primaries 54 and 56 are in series, any changes of resistance of these primaries, as a result of a change in their ambient temperature, for example, effects only the total current common to each primary leading to a cancellation of any error which might otherwise result from this variable parameter. In addition, when the reference voltage ($V_{61}+V_{73}$) and the voltage ($V_{44-n}$) across the secondary coil 44 are equal, equality is maintained even though large variations occur in the primary current since all of the iron in the circuit may be operated at points of nearly identical slopes on the respective BH curves. Thus, large source voltage variations can be accommodated without resulting error. Similarly, frequency variations in the source 46 are inherently negligible since the induced voltages of the secondary coil 44 and the secondaries of the transformers 50 and 52, as reduced by the dividing action of the resistors, all change by the same percentage when the reference voltage and the voltage across the coil 44 are equal.

Figure 3:
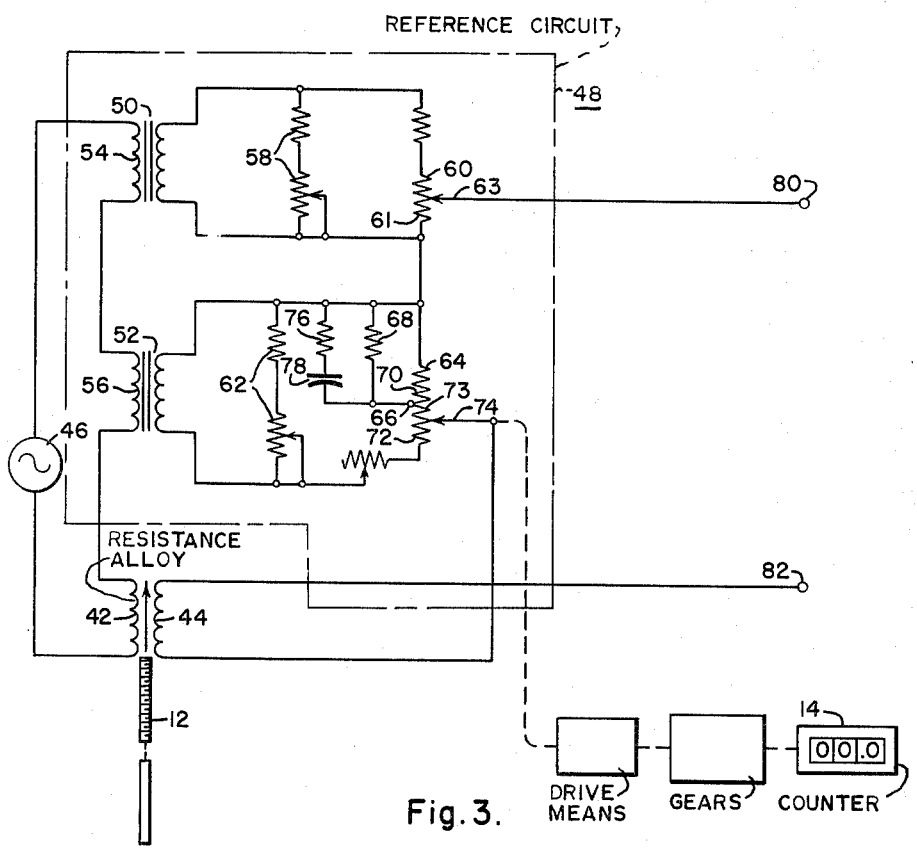
FIGURE 3 is a schematic circuit diagram of a portion of the arrangement depicted in FIG. 2.

With reference to FIG. 3, it is to be noted that the reference voltage ($V_{61}+V_{73}$) and the voltage ($V_{44-n}$) across the coil 44 are compared by a subtraction process with the difference between these voltages appearing across the terminals 80 and 82. With reference to FIG. 2, the voltage difference or the error voltage is amplified by any suitable amplifying means 84 with the output of the latter being fed into a two phase motor 86 which drives, through gears 88, the counter 14. In addition, a mechanical feedback path is provided from the gear 88 for adjusting, through suitable gear reduction boxes 90, the position of the potentiometer arm 74 so as to conform $V_{61}+V_{73}$ with $V_{44-n}$.

Figure 6:
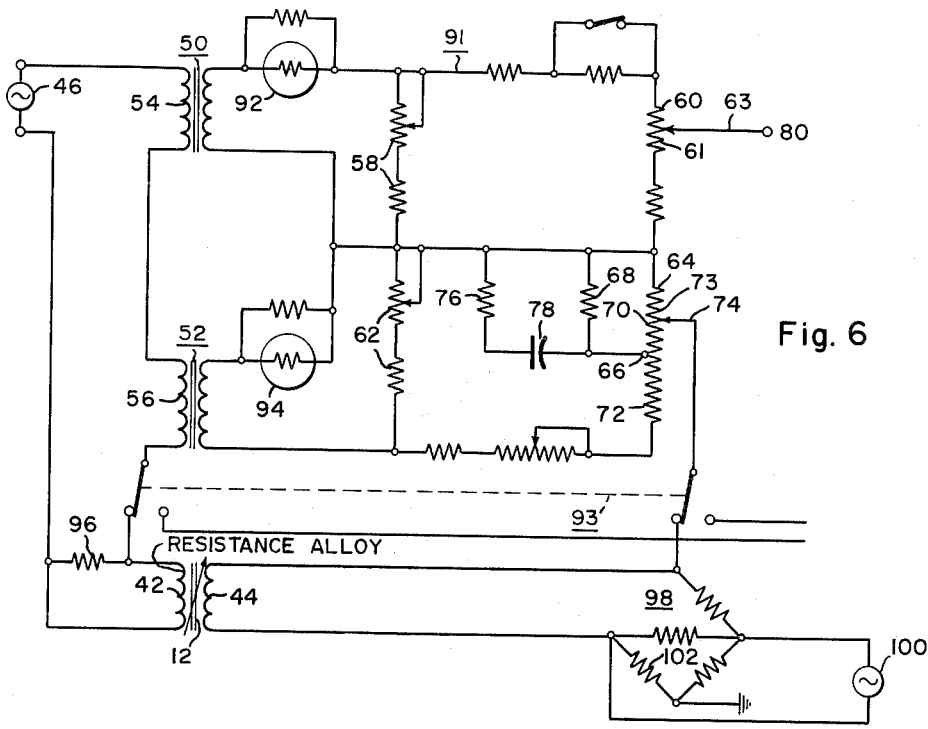
FIGURE 6 is a view similar to FIG. 3 with additional circuit elements being included to offset certain error effects.

A modified indicating arrangement 91, as shown partially in FIG. 6, can be employed so as also to minimize temperature effects on the secondary resistance of the transformers 50 and 52 and so as to minimize error resulting from such temperature effects. Thus, negative temperature coefficient resistors 92 and 94 are included in a series path with the secondaries of the transformers 50 and 52, respectively. In addition, the load resistance may be provided with a constant temperature coefficient and with a high ohmic value with respect to the internal resistance of the secondaries. With respect to the error effects caused by changes in temperature of the magnetic circuitry associated with the coil 44, it is clear that for a given position of the element 12, both the phase and the magnitude of the voltage $V_{44-n}$ are subject to change in response to changes in the temperature of the magnetic circuitry because of variation in iron losses and variation in permeability with temperature. The latter effect undergoes a sharp change as the curie point of the magnetic circuit is approached, but for ordinary applications this problem is not encountered.

Figure 8:
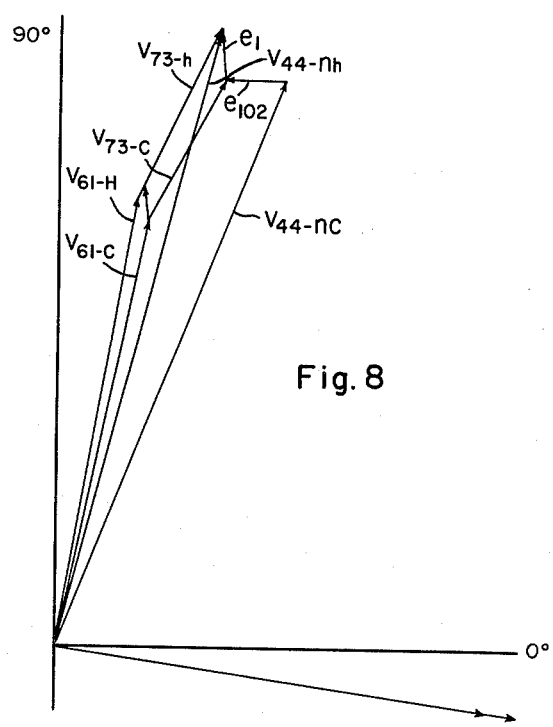

More particularly, for a given position $n$ and temperature $c$, a voltage $V_{44-nc}$ (FIG. 8) appears across the coil 44, and a voltage $V_{44-nh}$ appears across the coil 44 for a higher temperature H. Unless circuitry is provided to compensate for this difference, it is clear that the reference circuitry, if adjusted to match the output of the coil 44, would lead to an erroneous indication of position in either the cold or the hot condition (assuming alignment would be obtained to give a correct indication for one of these conditions).

One means for offsetting this variable factor is by introducing circuit elements providing voltages which generally offset any coil error voltages so as to enable the reference voltage ($V_{61}+V_{73}$) to be correlated, over expected temperature variation, with the voltage ($V_{44-n}$) of the coil 44 without any movement of the potentiometer arm 74. Compensating means are provided here in the form of a resistor 96 in parallel with the primary coil 42 so as to enable a greater current to flow through the transformer primaries 54 and 56 in proportion to increasing temperature. The net effect of this provision is that the total reference voltage changes from the sum of the voltage $V_{61-c}+V_{73-c}$ to $V_{61-h}+V_{73-h}$ with the difference between these sums being provided by the error voltage vector $e_1$.

In addition, the secondary coil 44 is included as an arm of a Wheatstone bridge 98 being supplied by a source 100 which is 180° out of phase with the source 46. The bridge 98 is imbalanced at temperature C (i.e. drop across an included resistor 102 differs from resistive component of $V_{44-nc}$) and for increasing temperature the bridge proceeds toward a balanced condition as a result of a decrease in the resistive component of voltage across the coil 44 until, at the temperature H (which may be the rated temperature limit of the system), the bridge 98 becomes balanced. The net effect of this provision is to provide an error voltage vector $e_{102}$ which when added to the coil voltage vector $V_{44-nc}$ equals the sum of $V_{61-c}$ and $V_{73-c}$ and which decreases in magnitude in proportion to increasing temperature until equal to 0 at temperature H. Thus, in the case of FIG. 8, the vector sum $V_{61}+V_{73}$ represents a voltage which adjusts over a given temperature range in magnitude and phase in accordance with variation of the error vector $e_1$ so as always to match the vector sum $V_{44-n}$ plus the error vector $e_{102}$. Accordingly, for a given element position $n$, the temperature parameter can vary from C to H without causing any movement in the potentiometer arm 74 and without any error in indication. Accuracy, therefore, exists notwithstanding the variant temperature parameter and its effect upon iron losses and permeability and circuit resistance. In FIG. 6, a two position switch 93 is provided with the position of the switch 93 illustrated in FIG. 6 being the operational position and the other switch position being used for calibration of the circuit means 91.

In the exemplary application cited previously, it was determined that, without correction, the temperature effects just considered are equivalent to about one and one-half inches error over a position range or path of 48.5 inches, and when corrected in the manner cited the error amounts only to .25 inch. In addition, other variable parameters lead to error effects well within accuracy specifications (namely plus or minus 1½%) as follows:

Line voltage ±10% _____ Yielded error .3 inch.
Frequency ±5% _____ Yielded no error.
Temperature of chassis on which
  circuitry was mounted ±25°
  C. _____ Yielded .1 inch error.
Deviation of locus L from true
  linearity _____ Yielded ±.05 inch error.
Wobble of element 12 _____ Yielded ±.25 inch error.
Temperature within closure
  20—150° to 550° F. _____ Yielded ±.25 inch error.

Thus, it appears that even if all of the errors listed above as resulting from variations in relevant respective parameters were to have a cumulative effect, the total error would be relatively small, but it is unlikely that a cumulative effect would occur since plus and minus error effects probably tend at least partially to cancel each other and since the error resulting from each parameter was measured to reflect substantially maximum effect from each other error producing parameter.

In the foregoing description, the mode of operation of several arrangements of specific elements has been related to point out the principles of the invention. The description, therefore, has only been illustrative of the invention, and, accordingly, it is desired that the invention be not limited by the embodiments described here but, rather, that it be accorded an interpretation consistent with the scope and spirit of its broad principles.

What is claimed is:
1. An indicating arrangement comprising an element of magnetic material which is movable over a given path, one primary and one secondary coil distributed in coupled relation along the length of said path, means for energizing said one primary coil from an alternating source, magnetic coupling influencing means positioned adjacent only one portion of said path to produce an output from said one secondary coil varying as a first function of the position of said element over said one portion of said path and varying as a second function of the position of said element over another portion of said path, reference circuit means including first and second transformers having the primaries thereof connected for energization by said source, said reference circuit means including a variable shunt resistor shunted across the output terminals of a secondary of said first transformer and a variable resistor connected in series with said first transformer secondary, said shunt and series connected variable resistors respectively aligning the phase and magnitude of a voltage derived from said first transformer secondary with that of said one secondary coil when said movable element is located at one limit of movement, said reference circuit means including another variable resistor shunted across the output terminals of a secondary of said second transformer and another variable resistor connected in series with said second transformer secondary, a third shunt resistor connected to shunt a portion of said other series connected variable resistor, said other shunt and series connected resistors establishing the phase and magnitude of a voltage derived from said second transformer secondary, means for adding said last-mentioned voltage to the aligned voltage derived from said first transformer secondary to obtain a total reference voltage conforming to the voltage of said secondary coil, and said third shunt resistor causing the mgnitude of the voltage derived from said second transformer secondary to vary as said first and said second functions with movement of a potentiometer arm over said portion and the remainder of said other series connected variable resistor, respectively.

2. An indicating arrangement comprising an element of magnetic material which is movable over a given path, one primary and one secondary coil distributed in coupled relation along the length of said path, means for energizing said one primary coil from an alternating source, magnetic coupling influencing means positioned adjacent only one portion of said path to produce a signal from said one secondary coil varying as a first function of the position of said element over said one portion of said path and varying as a second function of the position of said element over another portion of said path, reference circuit means including first and second transformers having the primaries thereof connected for energization by said source, said reference circuit means including a variable shunt resistor shunted across the output terminals of a secondary of said first transformer and a variable resistor connected in series with said first transformer secondary, said shunt and series connected variable resistors aligning the phase and magnitude of a voltage derived from said first transformer secondary with that of said one secondary coil when said movable element is located at one limit of movement, said reference circuit means including another variable shunt resistor shunted across the output terminals of a secondary of said second transformer and another variable resistor connected in series with said second transformer secondary, a third shunt resistor connected to shunt a portion of said other series connected variable resistor, said other shunt and series connected variable resistors respectively establishing the phase and magnitude of a voltage derived from said second transformer secondary, means for adding said last-mentioned voltage to the aligned voltage derived from said first transformer secondary to obtain a total reference voltage conforming to the voltage of said secondary coil, said third shunt resistor causing the magnitude of the voltage derived from said second transformer secondary to vary as said first and said second functions with movement of a potentiometer arm respectively over said portion and the remainder of said other series connected variable resistor, and means responsive to any difference between said total reference voltage and said one secondary coil signal to conform the former to the latter through movement of said potentiometer arm, and indicating means responsive to said last-mentioned means for indictating the position of said movable element.

3. An indicating arrangement comprising, an element of magnetic material which is movable over a given path, one primary and one secondary coil distributed in coupled relation along the length of said path, means for energizing said one primary coil from an alternating source, magnetic coupling influencing means positioned adajacent only one portion of said path to produce a signal from said one secondary coil varying as a first function of the position of said element over said one portion of said path and varying as a second function of the position of said element over another portion of said path, reference circuit means including first and second transformers having the primaries thereof connected for energization by said source, said reference circuit means including a variable shunt resistor shunted across the output terminals of a secondary of said first transformer and a variable resistor connected in series with said first transformer secondary, said shunt and series connected variable resistors respectively aligning the phase and magnitude of a voltage derived from said first transformer secondary with that of said secondary coil when said movable element is located at one limit of movement, said reference circuit means including another variable shunt resistor shunted across the output terminals of a secondary of said second transformer and another variable resistor connected in series with said second transformer secondary, a third shunt resistor connected to shunt a portion of said other series connected variable resistor, said other shunt and series connected variable resistors respectively establishing the phase and magnitude of a voltage derived from said second transformer secondary, means for adding said last-mentioned voltage to the aligned voltage derived from said first transformer secondary to obtain a total reference voltage conforming to the voltage of said secondary coil, said third shunt resistor causing the magnitude of the voltage derived from said second transformer secondary to vary as said first and said second functions with movement of a potentiometer arm over said portion and the remainder of said other series connected variable resistor respectively, and impedance means shunting said third shunt resistor substantially to align the phase of the drop across said one portion of said other series connected variable resistor with that of said other portion of the same.

4. An indicating arrangement comprising, an element of magnetic material which is movable over a given path, a first primary coil formed from resistance wire material and a secondary coil positioned in magnetically coupled relation with each other along the path of said element, means for energizing said primary coil from an alternating source so as to produce an electrical output from said secondary coil varying substantially as a function of the position of said element, and reference circuit means providing an electrical output, means for adjusting the phase and magnitude of said references circuits output with that from said secondary coil, said reference circuit means including at least one transformer having a second primary coil connected in series with said first primary coil for series energization from said source so that the position indication resulting from the adjusted output of said reference circuit means is substantially independent of at least some error producing parameter variations including those of the source frequency and voltage.

5. An indicating arrangement wherein an extraneous magnetic coupling influencing means alters the coupling of an inductance means over only one portion of a given path comprising, an element of magnetic material which is movable over said given path, said inductance means having a primary and a first secondary coil positioned in magnetically coupled relationship with each other along the length of said path, means for energizing said primary coil from an alternating source to produce an electrical output from said first secondary coil which varies in phase and magnitude as one function of the position of said element over said one portion of said path and which varies in phase and magnitude as another function of the position of said element over another portion of said path, reference circuit means including first and second transformers having respective primary coils connected in series with the inductance means primary coil for energization from said source, phase shifting and voltage adjusting means connected to a secondary coil of each of said transformers, circuit means for adding the outputs of each of said last-mentioned secondary coils to produce a vector sum from the voltages derived from said first and second transformers, whereby said sum conforms in magnitude and phase with said first secondary coil output.

6. An indicating arrangement wherein an extraneous magnetic coupling influencing means alters the coupling of an inductance means over only one portion of a given path comprising, an element of magnetic material which is movable over said given path, said inductance means having primary and secondary coils distributed in magnetically coupled relation with each other along the length of said path, means for energizing said primary coil from an alternating source to produce a first electrical output from said secondary coil which varies in magnitude and phase as one function of the position of said element over said one portion of said path and which varies in magnitude and phase as another function of the position of said element over another portion of said path, reference circuit means including first and second transformers having respective primary coils connected in series with the inductance means primary coil for energization from said source, phase shifting and voltage adjusting means connected to adjust said last-mentioned secondary coil outputs respectively in magnitude and phase with the magnitudes and phases of said functions of said first output, circuit means for adding the outputs of said secondary coils to produce a vector sum of voltage derived from said first and second transformers, whereby said sum conforms in phase to said first output, means responsive to any difference in magnitude between said inductance means output and said sum for adjusting the latter to the former by varying said voltage adjusting means, and indicating means for indicating accurately the position of said movable element.

7. An indicating arrangement wherein an extraneous magnetic coupling influencing means alters the coupling of an inductance means over only one portion of a given path comprising, an element of magnetic material which is movable over said given path, a primary coil formed from resistance wire material and a secondary coil positioned in magnetically coupled relation with each other along the length of said path, means for energizing said primary coil from an alternating source to produce an output from said secondary coil varying in phase and magnitude as one function of the position of said element over said one portion of said path and varying in phase and magnitude as another function of the position of said element over another portion of said path, reference circuit means including first and second transformers having respective primaries connected in series with the inductance means primary coil for energization from said source, phase shift and voltage adjusting means connected to a secondary coil of each of said transformers to vary the outputs therefrom in phase and magnitude in accordance with said functions, circuit means for adding the outputs of said last-mentioned secondary coils to produce a vector sum of voltages aligned with said secondary coil output, means for connecting said secondary coil in one arm of a bridge circuit, means for energizing said bridge 180° out of phase with said primary source, said bridge supplying a variable correcting component of voltage to the voltage of said secondary coil, a resistor connected across said primary coil to control the current through said transformer primaries and thereby provide another variable correcting component of voltage in said vector sum.

References Cited by the Examiner
UNITED STATES PATENTS

| | | | |
|---|---|---|---|
| 2,564,221 | 8/51 | Hornfeck | 324—34 |
| 2,885,660 | 5/59 | Hecox et al. | 324—34 |
| 2,945,166 | 7/60 | Bell | 318—20.175 |
| 2,992,373 | 7/61 | Golding | 340—199 |
| 3,099,823 | 7/63 | Bobula | 340—199 |

NEIL C. READ, *Primary Examiner.*

SAMUEL BERNSTEIN, THOMAS B. HABECKER,
*Examiners.*